United States Patent
Austin et al.

(10) Patent No.: US 8,682,262 B2
(45) Date of Patent: Mar. 25, 2014

(54) DUAL FUNCTION DEVICE

(75) Inventors: Stephen Christopher Austin, Pacifica, CA (US); Michael Denis O'Connor, Cary, NC (US); Terence Wilson, Alameda, CA (US)

(73) Assignee: Cisco Technology, Inc., San Jose, CA (US)

( * ) Notice: Subject to any disclaimer, the term of this patent is extended or adjusted under 35 U.S.C. 154(b) by 643 days.

(21) Appl. No.: 12/576,154

(22) Filed: Oct. 8, 2009

(65) Prior Publication Data

US 2010/0297964 A1 Nov. 25, 2010

Related U.S. Application Data

(60) Provisional application No. 61/179,688, filed on May 19, 2009.

(51) Int. Cl.
*H04B 1/02* (2006.01)

(52) U.S. Cl.
USPC ............................ 455/91; 455/556.1; 455/557

(58) Field of Classification Search
USPC ....................... 455/552.1, 556.1, 557, 559, 91
See application file for complete search history.

(56) References Cited

U.S. PATENT DOCUMENTS

| | | | |
|---|---|---|---|
| 6,611,658 B1 | 8/2003 | Takahashi | |
| 6,720,860 B1 | 4/2004 | Narayanaswami | |
| 6,819,677 B1 | 11/2004 | Nouzovsky et al. | |
| 7,511,848 B2 * | 3/2009 | Crosier et al. | 358/1.15 |
| 2004/0117632 A1 | 6/2004 | Arling et al. | |
| 2004/0177132 A1 | 9/2004 | Zhang et al. | |
| 2005/0060436 A1 | 3/2005 | Kienhoefer | |
| 2005/0066072 A1 | 3/2005 | Nakamura | |
| 2005/0134735 A1 | 6/2005 | Swartz | |
| 2005/0155077 A1 | 7/2005 | Lawrence et al. | |
| 2006/0002352 A1 | 1/2006 | Nakamura | |
| 2006/0083404 A1 | 4/2006 | Shimosato | |
| 2006/0150222 A1 | 7/2006 | McCafferty et al. | |
| 2006/0153383 A1 | 7/2006 | Bejean | |
| 2006/0227759 A1 | 10/2006 | Bohm et al. | |
| 2006/0282571 A1 | 12/2006 | Choi et al. | |
| 2006/0285514 A1 * | 12/2006 | Hoerl et al. | 370/328 |
| 2007/0021053 A1 | 1/2007 | Marrah | |

(Continued)

FOREIGN PATENT DOCUMENTS

WO 2008033507 A2 3/2008

OTHER PUBLICATIONS

International Search Report for PCT/US2010/035288 dated Jul. 20, 2010.

(Continued)

*Primary Examiner* — Christian Hannon
(74) *Attorney, Agent, or Firm* — Patterson & Sheridan, LLP

(57) ABSTRACT

A communication system for accessing media items via a display device. A receiver is coupled to the display device and a transmitter is coupled to a computer system. Media items stored locally on the computer system and/or remotely on a remote server may be wirelessly transferred from the transmitter to the receiver for display on the display device. In addition, the transmitter and the receiver may be pre-paired prior to delivery to the user, allowing for the network to be configured without any user input. Advantageously, embodiments provide a user with the ability to conveniently view content stored on a computer or a web server without the user having to perform any wireless network setup procedures.

19 Claims, 8 Drawing Sheets

(56) References Cited

U.S. PATENT DOCUMENTS

| | | |
|---|---|---|
| 2007/0032098 A1* | 2/2007 | Bowles et al. .................. 439/11 |
| 2007/0064681 A1 | 3/2007 | Boillot et al. |
| 2007/0106764 A1 | 5/2007 | Mansfield |
| 2007/0135866 A1 | 6/2007 | Baker et al. |
| 2007/0155358 A1 | 7/2007 | Krieger et al. |
| 2007/0245058 A1 | 10/2007 | Wurzberg et al. |
| 2007/0255868 A1 | 11/2007 | Chahal et al. |
| 2007/0297612 A1 | 12/2007 | Feder et al. |
| 2008/0005262 A1 | 1/2008 | Wurzberg et al. |
| 2008/0005409 A1 | 1/2008 | Kolokowsky et al. |
| 2008/0071935 A1 | 3/2008 | Ohta |
| 2008/0126584 A1* | 5/2008 | Mullis et al. ..................... 710/7 |
| 2008/0127289 A1 | 5/2008 | Julia et al. |
| 2008/0148057 A1 | 6/2008 | Hauw |
| 2009/0060198 A1 | 3/2009 | Little |
| 2009/0091656 A1 | 4/2009 | Kitaru et al. |
| 2009/0199253 A1 | 8/2009 | Zhang |
| 2009/0217335 A1 | 8/2009 | Wong et al. |
| 2009/0278993 A1 | 11/2009 | Nishikawa et al. |
| 2009/0313675 A1 | 12/2009 | Howarter et al. |
| 2010/0088524 A1 | 4/2010 | Ford et al. |
| 2010/0295994 A1 | 11/2010 | Kaplan et al. |
| 2010/0299417 A1 | 11/2010 | Austin et al. |
| 2010/0299712 A1 | 11/2010 | Austin et al. |

OTHER PUBLICATIONS

International Search Report for PCT/US2010/035292 dated Jul. 20, 2010.

International Search Report for PCT/US2010/035274 dated Jul. 20, 2010.

Office Action, U.S. Appl. No. 12/576,167 dated Apr. 21, 2011.

* cited by examiner

DUAL FUNCTION DEVICE

CROSS-REFERENCE TO RELATED APPLICATIONS

This application claims benefit of U.S. provisional patent application Ser. No. 61/179,688 filed on May 19, 2009, which is hereby incorporated herein by reference.

BACKGROUND OF THE INVENTION

Digital video cameras enable a user to capture video footage, which can be viewed on a computer or television, uploaded to video sharing websites, or recorded onto a recording medium such as a DVD. Typically, transferring video footage from a digital video camera to an external device such as a television or computer requires the use of a video cable and software to connect the digital video camera to the external device. Some models of digital video cameras provide a built-in Universal Serial Bus (USB) connector to facilitate transfer of video footage from/to the digital video camera and the external device. In order to view video footage on a television, a user typically uses a cable (e.g., a cable with both video and audio connectors) to connect the digital video camera to the inputs of the television, and then uses a user interface on the digital video camera to initiate and control the playback of the video footage displayed on the television. Some digital video cameras also utilize a remote control to supplement or replace the user interface on the digital video camera during playback to the television. This method of viewing video footage on a television presents several difficulties, including either using the batteries in the digital video camera or providing external power to the digital video camera during playback, positioning of the digital video camera close to the television while the user is typically sitting farther from the television during video playback, and the like.

If the user has already downloaded the video content recorded on the digital video camera to a computer, the video content can be viewed on the computer display. However, many users prefer to watch video footage on a television, which is typically located at a distance (e.g., in a separate room) from the computer. One approach is to use the computer to burn a digital versatile disc (DVD) including the video content. However, burning a DVD is a complicated operation for some users and requires use of DVD media. Additionally, DVDs have limits on the length of videos that can be stored on the DVD, typically one or two hours of video. Thus, for video footage of longer durations, multiple DVDs are typically required. Another approach is to transmit the video footage from the computer to the television. 802.11-based media extenders have been developed for this purpose. Using 802.11-based wireless networks is a challenging endeavor for many users. Setting up the network is a complicated process that many users find difficult and frustrating, including issues related to firewalls, port forwarding, dynamic Domain Name System (DNS), etc. The challenges of setting up and operating 802.11-based networks is a contributing factor to the high return rate of wireless networking equipment.

Despite the capabilities of currently available systems, the viewing experience of digital video for many users is less than desirable. Thus, there is a need in the art for improved methods and systems for viewing video footage on a display device.

SUMMARY

One embodiment of the invention provides a method for operating a transmitter. The method includes determining that the transmitter is coupled to a computer system; reading network parameters stored in a non-volatile memory included in the transmitter device; transmitting a command to the transmitter device to switch the transmitter device from a mass storage mode to a wireless communication mode; and causing the transmitter device to establish a network connection with a receiver device.

Another embodiment of the invention provides a device that includes a non-volatile memory storing a software program; a connector adapted to couple the device to a computer system, where the software program is transmitted between the device and the computer system via the connector when the device is coupled to the computer system and operating in a mass storage mode; and switching logic configured to switch the device from the mass storage mode to another mode, where the device can perform one or more operations when operating in the another mode.

Many benefits are achieved by way of embodiments of the present invention over conventional techniques. For example, embodiments of the present invention provide an enhanced user experience in comparison with conventional wireless communications networks. Additionally, embodiments provide a user with the ability to conveniently view video footage stored on a computer or a web server on a television without having to perform any wireless network setup procedures. As an example, embodiments of the present invention provide a simple and reliable way for viewing videos, movies, photos, and other media on a home television. Utilizing the embodiments described herein, consumers can effectively bring their multimedia content onto their primary viewing device (i.e., the TV) and enjoy this media in a comfortable setting such as a living room. These and other embodiments of the invention along with many of its advantages and features are described in more detail in conjunction with the text below and attached figures.

DESCRIPTION OF EXAMPLE EMBODIMENTS

Embodiments of the present invention relate to transmitting video footage from a source to a display device. Merely by way of example, embodiments of the invention are applied to a communications system including a transmitter coupled to a computer and a receiver coupled to any type of display device, such as a television, a monitor, or any other type of display device. The methods and techniques can be applied to video footage stored on a web server, a local machine, a remote machine, and the like.

According to an embodiment of the present invention, a system for transmitting video content from a computer to a display device is provided. The system includes a receiver operable to communicate with the display device. The receiver includes a first wireless transceiver, a video output, and an audio output. The system also includes a transmitter operable to communicate with the computer. The transmitter also includes a wireless transceiver. The receiver and the transmitter are operable to perform two-way wireless communication with each other.

According to yet another embodiment of the present invention, a method of transmitting video content is provided. The method includes establishing a connection between a receiver and a display device. The receiver includes a first wireless transceiver, a video output, and an audio output. The method also includes establishing a connection between a transmitter and a computer. The transmitter includes a second wireless transceiver and memory and the transmitter is operable to operate in a first mode and a second mode. The method further includes uploading software from the memory of the transmitter to the computer while operating in the first mode and transmitting the video content from the transmitter to the receiver while operating in the second mode.

System Overview

Figure 1:
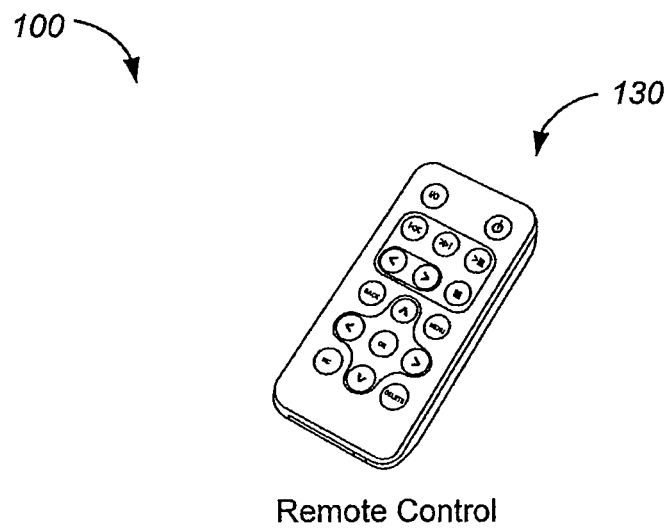
FIG. 1 is a simplified illustration of elements of a communications system, according to an embodiment of the present invention.
Figure 1:
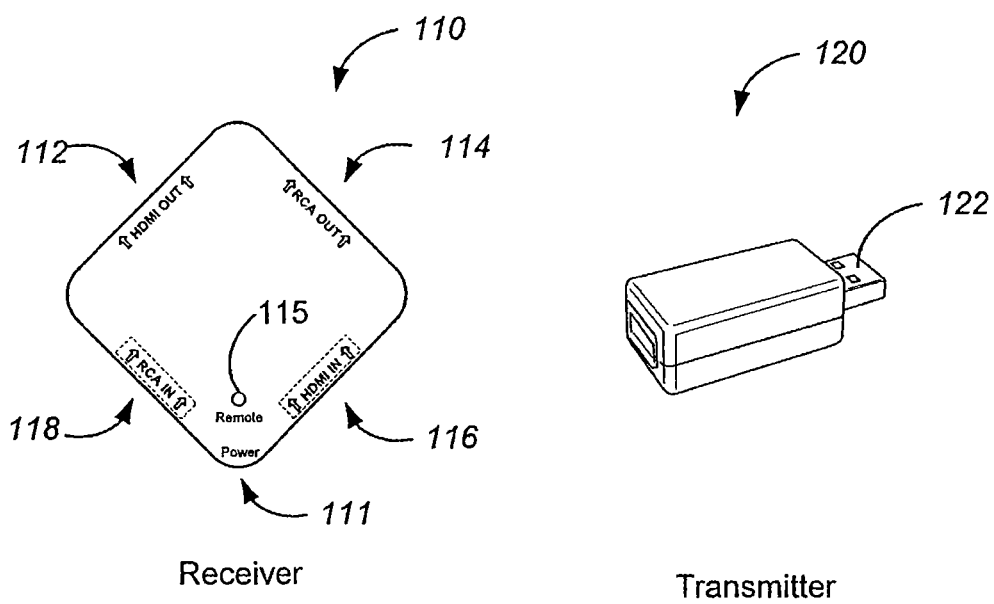
Figure 3:
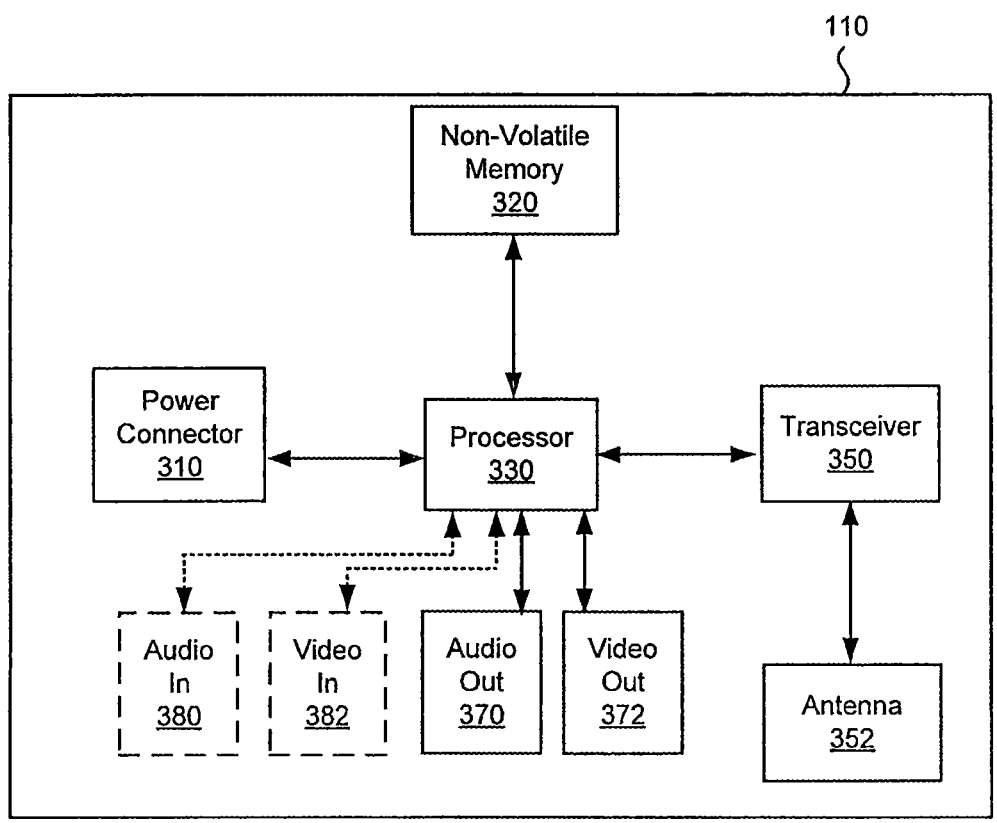
FIG. 3 is a simplified schematic diagram of a receiver, according to an embodiment of the present invention.

FIG. 1 is a simplified illustration of elements of a communications system 100, according to an embodiment of the present invention. The communications system 100 includes a receiver 110 operable to communicate with a display device. The receiver 110, which may be a transceiver, includes the ability to both transmit and to receive data from a matched transceiver (i.e., transmitter 120). Because receiving data for display on the display device is the primary function of the receiver 110, it is referred to as a receiver, despite the fact that in some embodiments the receiver 110 includes the functionality of transmitting data as well. In one embodiment, the receiver 110 includes a wireless transceiver 350 as illustrated in FIG. 3. The receiver 110 also includes one or more video outputs and one or more audio outputs as described more fully below. As shown in FIG. 1, the receiver includes a High-Definition Multimedia Interface (HDMI) output 112 that carries both audio and video signals, as well as RCA outputs 114, including separate output ports for composite video and stereo audio (left and right). In another embodiment, component video outputs may be provided as appropriate to the particular application. Preferably, the RCA audio outputs will be active concurrently with the HDMI output so that the RCA audio outputs can be used in parallel with the HDMI output. The receiver includes a power port 111 to receive power from a power source and to power the various components of the receiver 110.

The communications system 100 also includes a transmitter 120. The transmitter 120, which may also be a transceiver, includes the ability to both transmit and receive data from a matched transceiver (i.e., receiver 110). Because transmitting data for subsequent display on the display device is, in some embodiments, the primary function of the transmitter 120, the transmitter 120 is referred to as a "transmitter," despite the fact that the transmitter 120 includes the functionality of receiving data as well. In a particular embodiment, the transmitter 120 is a dongle including a connector 122 compliant with the Universal Serial Bus (USB) standard and operable to be inserted into a USB port of a computer, for example, a personal computer. As described in greater detail in FIG. 4, the transmitter 120 includes a wireless transceiver 450 that is operable to transmit data from the computer to the receiver 110. For example, the data may include video and audio data for display on the display device.

According to embodiments of the present invention, the receiver 110 and the transmitter 120 are pre-paired during the manufacturing process. Thus, when a user first sets up the communications systems, there is no need for the user to pair or define settings associated with the communication that occurs between the receiver 110 and the transmitter 120. This embodiment contrasts with conventional wireless networking equipment, for which a user typically needs to manually pair the various devices prior to use. As an example, in a conventional 802.11-based network, a user needs to set the Service Set Identifier (SSID), password, and/or other network parameters that enable the various network elements to communicate. In the embodiments described herein, such settings are pre-set at the time of manufacturing as part of the manufacturing process or at other time prior to delivery to the user. Thus, when the user first installs the equipment, the parameters necessary for two-way communications between the receiver 110 and the transmitter 120 are already set. As a result, the user is provided with a fully functioning communications system straight "out-of-the-box."

In some embodiments, the communications system 100 may also include a remote control 130. The remote control is operable to communicate with receiver 110 and may be used to control the playback of video footage on the display device. Like the transmitter 120, the remote control 130 is also pre-paired with the receiver 110 prior to delivery to the user. In some embodiments, the remote control 130 is also able to control operation of the transmitter 120, although this feature is not required by embodiments of the present invention. As described in more detail in FIG. 2, the receiver 110, transmitter 120, and/or the remote control 130 provide a system used to view video footage stored in various manners, such as on a computer, stored on a remote site such as a web server, or the like.

The remote control 130 includes user input buttons including play, pause, fast forward, rewind, next track, previous track, volume up, volume down, mute, and the like. Other functionality as appropriate to the particular embodiment can be implemented in the remote control 130 as needed. For example, a "favorites" button may be provided that allows a user to mark a particular media item as a favorite. A signal is transmitted from the remote control 130 to the receiver 110 that indicates that a selected media item should be marked as a favorite. The receiver 110, then, transmits a signal to the transmitter 120 indicating that the selected media item should be marked as a favorite. The transmitter 120, in turn, conveys this information to the software executing on the computer 220 by sending a signal to the computer 220. The software executing on the computer 220 updates the metadata associated with a local copy of the selected media item to indicate that the selected media item should be marked as a favorite. If the selected media item is also stored on a remote server and is being accessed remotely, then metadata associated with the copy of the media item stored on the remote server is updated as well. As another example, another button may be provided on the remote control 130 that allows a user to mark a selected media item to be transmitted to a particular person or stored on a remote server. One of ordinary skill in the art would recognize many variations, modifications, and alternatives.

Figure 2:
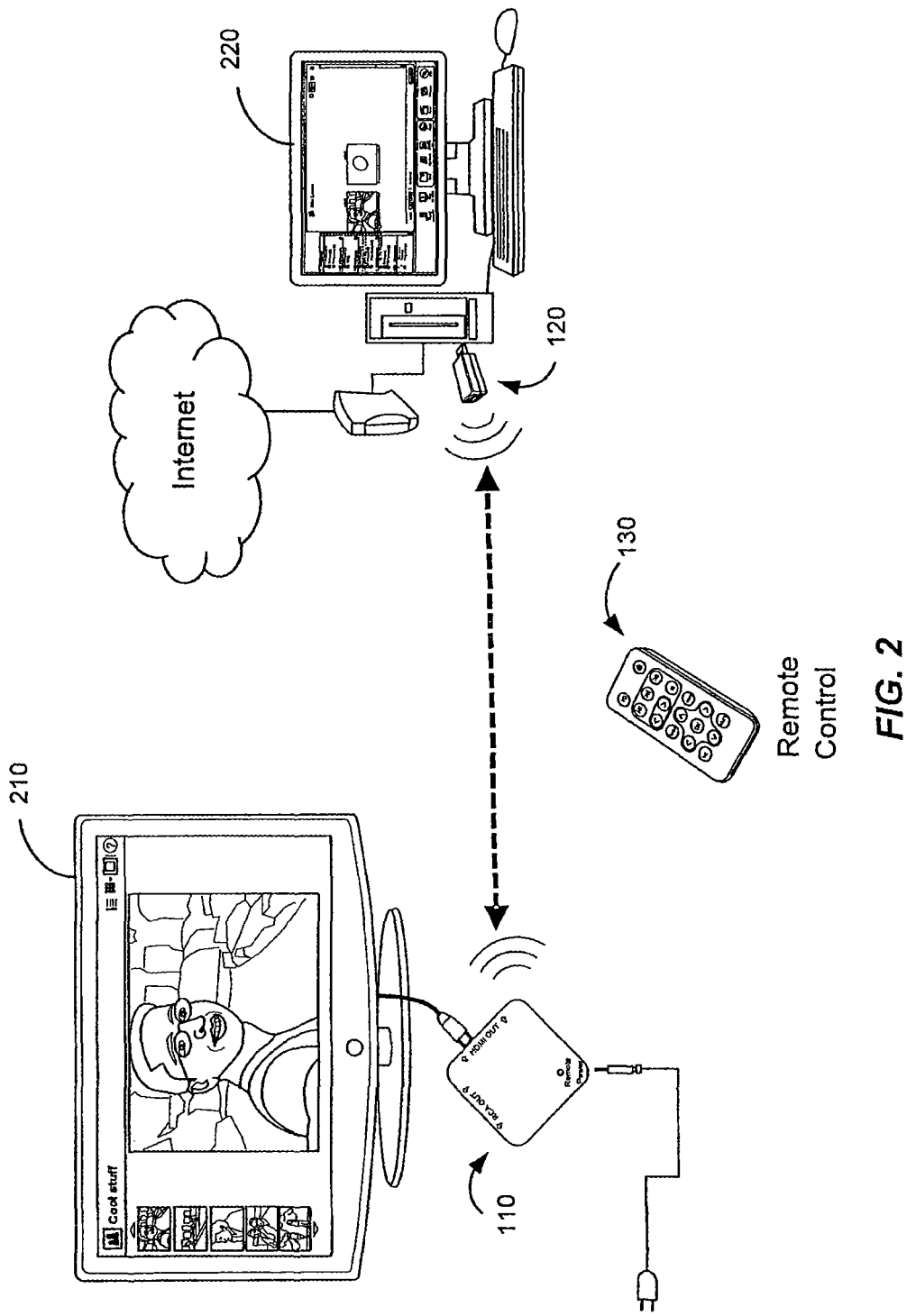
FIG. 2 is a simplified illustration of an exemplary use of the communications system, according to an embodiment of the present invention.

FIG. 2 is a simplified illustration of an exemplary use of the communications system, according to an embodiment of the present invention. As shown, the receiver 110 is connected to display device 210, for example, a television or other video display monitor. The embodiment illustrated in FIG. 2 utilizes an HDMI cable carrying both audio and video data from the receiver 110 to the display device 210. In one embodiment, in order to view content received by the receiver 110, the user may select an input on the display device 210 corresponding to the input connector to which the HDMI cable or other cable(s) is connected. In another embodiment, composite video and stereo audio RCA outputs, component video outputs, analog audio/visual outputs, or the like are utilized. In one embodiment, the receiver 110 communicates with the transmitter 120 as a dedicated solution. One of the benefits provided by embodiments of the present invention is that the various components of communications system 100 can be configured to not interact with other, non-system components and devices. In a typical use case of an embodiment of the invention, there may be additional wireless devices in the proximity of communication system 100. However, embodiments of the present invention provide a "walled garden" approach in which no configuration actions on the part of the user are needed. Because the receiver 110, the transmitter 120, and/or the remote control 130 are pre-paired prior to shipment from the manufacturer and/or delivery to the user, the user does not need to configure these devices and the user experience is more streamlined—the user just plugs-in the devices and they operate as intended. As an example, the receiver 110 is coupled to a television using an HDMI cable, the transmitter 120 is inserted into the USB port of a computer containing video files, and with no wireless setup actions, the user is able to watch the videos on the television. This contrasts sharply with conventional wireless networking system setup procedures.

Target customers for the products described herein include owners of digital video cameras. As described more fully in relation to FIG. 4, the transmitter 120 may includes software that is configured to access video footage stored on a computer or on a web server accessible through the Internet. In some embodiments, when the transmitter 120 is plugged into the computer for the first time, the software may be uploaded to and installed on the computer (automatically in some embodiments). Using the installed software, the user is able to access video footage or other media stored on the computer, transmit the media to the receiver 110, and view and/or listen to the media on the display device 210. In other embodiments, a user is able to download the appropriate software from the Internet.

The ease of installation and use enables users that are not particularly technology savvy to enjoy the benefits of more widely present video footage. As an example, it may be desirable to share videos on a user's computer with a family member without a digital video camera or a wireless network, but with a television, a computer, and an Internet connection. The family member purchases a system as described herein, couples the receiver 110 to the television and couples the transmitter 120 to the computer. After the installation of software resident on the transmitter, typically only requiring an acceptance of a click-through license agreement by the family member, the family member is able to receive videos from the user and then watch them on their television. In other implementations, a user account may be created or other setup procedures may be performed. Other content that is downloaded to the computer can also be viewed on the television, which is typically a more comfortable viewing environment than the computer, using the communications system described herein. It should be noted that various methods for identifying the receiver 110 as a network element may be used, as described in greater detail herein.

Embodiments of the present invention provide for a variety of sources of media for viewing using communications system 100. As an example, videos may be stored on the computer or on a web server accessible through the Internet. Additionally, in some embodiments, a user is able to define one or more channels and associate other users with these channels. Video content is then shared using these channels to the associated users.

Although the system illustrated in FIG. 2 includes receiver 110, other embodiments replace the receiver 110 with a router that is operable to communicate with the transmitter 120. The router can serve other functions than delivering content to the display device, for example, other wireless communications functions. The router in this embodiment is operable to interact with not only the transmitter but the software resident on the computer. In still further embodiments, the receiver 110 may be replaced by any device that would typically be plugged into a computer and would typically require a driver, such as a computer peripheral (e.g., a printer or a scanner), among others. For example, a transmitter 120 (i.e., a dongle) may be provided that is configured to communicate with one or more of other devices.

Referring once again to the embodiment shown in FIG. 2, the display device 210 may show a user interface generated either by the receiver 110, the transmitter 120, the computer 220, or some combination thereof. As an example, the user interface displayed could be a version of software executing on the computer 220 modified for display on a television. Depending on the particular implementation, the processing load for generating the user interface and processing of the video signal may be distributed between the receiver 110 and/or the combination of the transmitter 120 and/or computer 220. Since the computer typically has significant computing resources available, a specific embodiment utilizes the computer 220 to perform the vast majority of processing, merely relying on the receiver 110 to receive and display the received data. In this specific embodiment, the computer renders the information to be displayed as the user interface, the computer renders video footage at 30 frames per second (or another appropriate frame rate) that is broadcast to the television, and the like. Since a broadcast-ready video signal is transmitted to the receiver in this embodiment, the receiver only needs to pass this video signal through to the display device, greatly reducing the processing load on the receiver 110.

In another embodiment, at the other end of the processing spectrum, much of the processing may be performed in the receiver 110. In this alternative embodiment, the receiver 110 may have significant computing resources. Video processing, buffering, storage, and the like may be performed in the receiver. Other embodiments also fall at other points along the spectrum, dividing the processing tasks between the computer 220, the transmitter 120, and the receiver 110.

As an example use case, a user uses remote control 130 to control the receiver 110. The user interface is displayed on the display device 210 and two-way communication is established between the receiver 110 and the transmitter 120. Requests from the user may pass from the remote control 130 to the receiver 110, through the wireless connection to the transmitter 120, and then from the transmitter 120 to the computer 220. For an application executing on the computer 220, information related to the available videos (i.e., metadata) may be transmitted from the transmitter 120 to the receiver 110 and displayed on the display device 210. Using the remote control 130, the user may select a video to be played and the selected video footage may be transmitted from the computer 220 through the transmitter 120 to the receiver 110 and then displayed on the display device 210.

In various embodiments, metadata associated with the video content stored on the computer 220 or on the Internet is available to the system and can be used to sort, categorize, or otherwise manage the video content. As an example, if a particular video is marked as a favorite, given a name, placed in one or more particular folders, or the like, this information may be available to the user through the user interface displayed on the display device 210. The availability of this metadata contrasts with conventional media extenders in which only video content is available. Additionally, since embodiments of the present invention provide custom software solutions, the methods and systems described herein make available proprietary features such as user-defined channels that are not available using conventional techniques.

In one embodiment, the user interface displayed on the display device 210 is simple to use and requires little or no training. Some embodiments provide for customization of the user interface although this is not required by embodiments of the present invention. As an example, keyboard shortcuts could be included, although not used by all users. Additionally, in some embodiments, changes made by a user interacting with the software executing on the computer 220 may be reflected in the user interface displayed to the user on the display device 210. For example, one or more media items may be marked as "favorites" or "new." Media items that are marked as new, in some embodiments, include those media items that have not yet been viewed.

In some embodiments, the communications channel between the transmitter 120 and the receiver 110 is provided in accordance with commercially available wireless communications standards. For example, using the IEEE 802.11n wireless standard, bandwidth suitable for high definition (HD) videos (e.g., 10 megabits per second) is provided. Other wireless standards providing suitable bandwidth can also be utilized. One of ordinary skill in the art would recognize many variations, modifications, and alternatives. For example, the bandwidth of the connection between the transmitter 120 and the receiver 110 may be limited to a predefined level when the content being transmitted over the communication channel is being transmitted from a remote server, e.g., 1 megabits per second. The predefined level, in some embodiments, may be configurable by the user.

In some implementations, the bandwidth of the communications channel can be conserved by performing some video processing at the receiver 110. For example, if video content is stored on the computer 220 at a resolution of 480p, upscaling could be performed on the receiver 110 to provide a 720p signal for display on the display device 210 (e.g., the television). A benefit of using an HDMI connector to couple the receiver 110 and the display device 210 is that the television is able to scale video content received over an HDMI connection to a scale appropriate for the particular television. For example, if the television can display 1080p video content and the content provided by the HDMI connection is 720p, then the television can upscale the content to 1080p for display.

Embodiments of the present invention provide for personalization of content provided in channels the user has established. For example, if a channel is associated with a hockey team of a user, the display on the display device 210 could be personalized with hockey-related themes or the like. The background of the user interface, generated either at the computer 220 or the receiver 110, could be hockey-based. More sophisticated environments and attributes related to hockey could also be provided, such as news or information feeds. One of ordinary skill in the art would recognize many variations, modifications, and alternatives.

According to embodiments of the present invention, the connection between the remote control 130 and the receiver 110 is a radio frequency (RF) connection so that line-of-sight is not required between the remote control 130 and the receiver 110. This feature enables the receiver 110 to be placed at a location behind other components, for example, at the back of an entertainment center in a user's home. Thus, the receiver 110 does not have to be a "front row" device, competing for shelf space with other audio-visual system components. In addition to non line-of-sight communications, the range for RF connections is typically greater than that available with infrared connections. The RF nature of the remote control 130 allows the remote control to also be used in conjunction with the transmitter 120, which may be coupled to a computer 220 that is not located in the room with the receiver 110 and display device 210. In an alternative embodiment, the remote control operates using infrared technology.

The pre-pairing of the remote control with the receiver also solves potential problems with cross-talk between adjacent systems. As an example, if a user is installing communications system 100 in an apartment complex in which another user has already installed a similar communications system, it would be undesirable to have one user's remote control controlling another user's receiver. The pre-pairing of the remote control and receiver during manufacturing prevents this undesirable cross-talk, thereby enhancing the user experience.

In one embodiment, the receiver is configured to operate in a "pass-through" mode. In the pass-through mode, the receiver is installed between another user device (e.g., a set-top box, a DVD player, or the like) and the display device (e.g., a television). The signal from the user device passes through the receiver during normal operation of the user device. However, when the receiver begins to receive data from the transmitter, a switch in the receiver switches the video path from the user device to the transmitter. In another embodiment, when the receiver is powered on, the receiver could switch the video path. In yet another embodiment, the switch includes a sensor responsive to incoming video signals and switches to the active video signal, with priority being given to video from the transmitter. In these embodiments, the user does not need to switch the input on the display device in order to view content received by the receiver. Referring to FIG. 1, an optional pass-through HDMI input 116 and optional pass-through RCA inputs 118 are illustrated. In other embodiments, these optional inputs are not utilized and data is received at the receiver using only the wireless connection to the transmitter.

In addition to switching from one video input to another video input in the pass-through configuration, overlay technologies are included within the scope of the present invention. Using these overlay technologies, a signal from a set-top box or other user device could be provided to the television, but overlaid with a signal from the transmitter. Typically, the overlaying of the signal would be performed using a processor in the receiver and would not involve processing of the video signal received from the set-top box, but merely overlaying of an additional signal. As an example, if a new video is available for viewing, a logo could be displayed on the television, overlaid on the video signal from the set-top box, indicating the availability of the new video. One of ordinary skill in the art would recognize many variations, modifications, and alternatives.

According to some embodiments of the present invention, status indicators 115 are provided on the receiver, through the user interface, or combinations thereof. As an example, LED status indicators 115 are illustrated on the receiver in FIG. 1 and may be used to indicate lack of connection to a paired device (e.g., a transmitter or remote control), presence of connection, but at a data rate unsuitable for video signals or certain types of video signals (e.g., HD signals), or the presence of a suitable connection, among others. Additional status indicators could be provided on the transmitter indicating similar or other characteristics. Moreover, status indicators could be provided through software on the computer, delivered to the user through the user interface.

It should be noted that communications both downstream (i.e., transmitter to receiver) and upstream (i.e., receiver to transmitter) are provided by embodiments of the present invention. In addition to control commands transmitted from the remote control to the receiver and then to the transmitter, status information is also transmitted upstream, providing the user with enhanced control in comparison with conventional systems.

Utilizing the system illustrated in FIG. 2, users can enjoy multimedia content after minimal setup requiring little technical know-how. The system includes one or more of the following features and benefits: (1) no cables between the TV and the computer; (2) no need for wireless network setup or configuration by the user; (3) no complex software installation or online setup; (4) no long delays, video download, or general "wait time;" and/or (5) completely secure (e.g., no one else can view personal videos). Once the system is operational, in some embodiments, the user can access some or all of the videos, movies, and/or photos stored on their computer, as well as online content accessible through the Internet. Using the remote control, users can easily play back videos on their TV as well as potentially interact with the computer, opening up many possibilities for future features and services.

The system illustrated in FIG. 2 can be characterized by a number of technical specifications. The following specifications are not intended to limit the scope of embodiments of the present invention but merely to provide an example of system specifications for a particular embodiment. Specifications for the overall system are provided in Table 1, specifications for the receiver are provided in Table 2, specifications for the transmitter are provided in Table 3, and specifications for the remote control are provided in Table 4.

TABLE 1

| Feature | Specification |
|---|---|
| Wireless Range | Up to 200 ft with clear line of sight with up to 50 ft reduction per wall (construction material dependent) |
| Wireless Bandwidth | 12 Mbits/sec |
| Wireless Security | Proprietary streams; No access to computer through transmitter |
| Wireless Interference | Compliance with FCC and WiFi requirements |
| Pairing | Pre-pairing of receiver, transmitter, and remote control as a component of the manufacturing process |
| Response Durations | No longer than 3 seconds of latency for starting playback on the display device; Minimal latency for selection/navigation, preferably less than 1/10th of a second; Pause and continue playing - nearly instantaneous; Skip next/previous - up to 3 seconds; |

TABLE 1-continued

| Feature | Specification |
|---|---|
| | Enter new folder (populate one screen's worth of thumbnails) - nearly instantaneous; Display a screen's worth of folder names -- nearly instantaneous; Boot time for receiver - up to 10 seconds; Initial sync or re-sync between transmitter and receiver - nearly instantaneous feedback that syncing is underway, syncing complete within 5 seconds. |
| Localization | Country specific |
| Co-existence | Multiple systems can co-exist within range of each other; no cross-talk between systems |
| Updates | Software and firmware update process similar to Flip camcorder products; Receiver updates are sent remotely via wireless connection; Remote control and transmitter are not anticipated to require firmware upgrades |
| Video Pass-through | Overlay of graphics on video passed through receiver; Notification of newly arrived videos |
| Video Controls | Play; Pause; Fast Forward; Rewind; Skip next/previous |
| Out-of-the-box user experience | Components can be connected in any order; On-screen guide (PC or TV) to assist with setup and/or troubleshooting; Signal strength indicator on receiver and/or shown graphically as a signal meter on the TV and/or PC as part of setup and troubleshooting |

TABLE 2

| Feature | Specification |
|---|---|
| Inputs | Optional HDMI; Optional RCA Composite Video + Stereo Audio; Power |
| Outputs | HDMI; RCA Composite Video + Stereo Audio; Optional DVI |
| Optional Pass-through | RCA Composite Video + Stereo Audio pass-through; HDMI pass-through; Pass-through functionality is active when receiver is not in use |
| Display Resolution | NTSC: 720 × 480 interlaced, 30 fps; PAL: 720 × 576 interlaced, 25 fps; HDMI (US): 1280 × 720 progressive, 30 fps; HDMI (EU): 1280 × 720 progressive, 25 fps |
| TV Standards | NTSC; PAL |
| Status LED(s) | OK (Wireless connection; Acceptable bandwidth); Reduced Bandwidth; (Wireless connection; Bandwidth lower than specification); No connection (No wireless connection); Power indicator |
| File Format Playback Compatibility | 640 × 480, 30 fps MPEG-4 AVI; 640 × 480, 30 fps MPEG-4 AVI; 1280 × 720, 30 fps H.264 MP4; 640 × 480, 30 fps H.264 MP4; 480 × 360 H.264 MP4; 480 × 270 H.264 MP4; 1280 × 720, 30 fps H.264 MP4; 640 × 480, 30 fps H.264 MP4 |
| Boot Time | Less than 10 seconds |
| Playback Mode | Pause/Play/Previous Clip/Next Clip/Exit; Ability to mark favorites |
| Screen Saver | Plays videos with no audio |

TABLE 3

| Feature | Specification |
|---|---|
| Range | Non-line of sight (RF); Up to 50 ft |
| Battery Life | More than 1 year |
| Battery Indicator | Notification to receiver when batteries are low |
| Buttons | Up/Down/Left/Right; Select/Enter |
| Universal Compatibility | Programmable into universal remote controls |
| Find my Remote | Activated through software on computer; Beeps beeper in remote |

TABLE 4

| Feature | Specification |
| --- | --- |
| Interface | USB 2.0 |
| Power | USB bus power |
| Co-existence | Can co-exist with Flip camcorder |
| Storage | 256 MB capacity; Pre-loaded with software |

FIG. 3 is a simplified schematic diagram of a receiver 110, according to an embodiment of the present invention. The receiver 110 includes a power connector 310 configured to receive power from a power supply, such as a 110-volt electric supply. In one embodiment, a power port 111 on the side of the receiver 110, as illustrated in FIG. 1, is utilized as the power connector 310. The receiver 110 also includes processor 330 and transceiver 350, which is coupled to antenna 352. The transceiver 350 is operable to provide two-way communications with a matched transceiver in the transmitter 120. In some embodiments, the receiver 110 provides for two-way communications. However, since the dominant operation of the receiver is receiving video content transmitted by the transmitter 120, the nomenclature of "receiver" is used herein to describe this component of the communications system.

The receiver 110 includes one or more audio outputs 370 and one or more video outputs 372. The audio outputs 370 provide an audio signal to a display device, such as a television. The video outputs 372 provide a video signal to the display device. A wide variety of audio and video outputs are included within the scope of embodiments of the present invention. For example, the audio and video outputs can be combined in an HDMI output configured to connect to an HDMI cable. Since HDMI cables carry both audio and video signals, only a single cable is needed to couple the receiver 110 to the display device. In other applications, RCA component video outputs, optical-fiber based outputs, composite video outputs, S-Video outputs, or the like are utilized. One of ordinary skill in the art would recognize many variations, modifications, and alternatives.

Optional audio inputs 380 and video inputs 382 are illustrated in FIG. 3. These optional inputs, which correspond to optional HDMI input 116 and optional RCA inputs 118 illustrated in FIG. 1, are utilized, in some embodiments, when the receiver 110 is employed in a "pass-through" configuration. In a pass-through configuration, audio and video signals from a device, such as a set-top box, are provided to the audio in 380 and the video in 382, respectively, of the receiver 110, which then pass these signals to the audio out 370 and the video out 372, respectively, in a first mode of operation. Alternatively, when video content from the transmitter 120 is received by the transceiver 350, the signal passed to the audio and video out is changed to display the video content received through the wireless connection on the display device. In some embodiments, this is a second mode of operation. Thus, in configurations where the number of inputs to the display device is limited, only a single input or cable is needed to display content from either the other device or from the transmitter 120. The mechanism for transitioning from one input signal to another may depend on the particular application and should not be understood to limit embodiments of the present invention. For example, the receiver may include non-volatile memory 320 used to store settings and the like. In a particular embodiment of the present invention, the receiver 110 may be integrated into the display device, thus further reducing complexity and the need of providing a cable between the receiver 110 and the display device.

Figure 4:
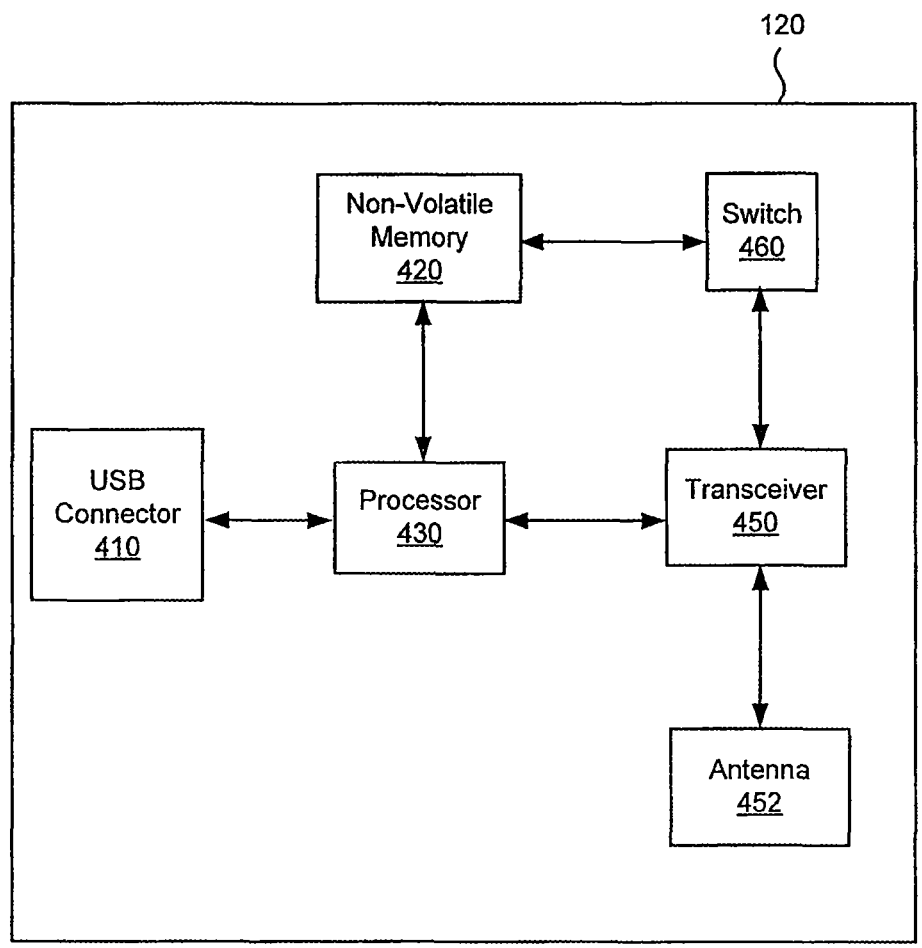
FIG. 4 is a simplified schematic diagram of a transmitter, according to an embodiment of the present invention.

FIG. 4 is a simplified schematic diagram of a transmitter 120, according to an embodiment of the present invention. The transmitter 120 includes a USB connector 410 connected to processor 430. Although the USB connector 410 is illustrated in FIG. 4, the USB connector 410 is not required by embodiments of the present invention and other suitable communications protocols and standards can be utilized by other embodiments of the present invention. The ubiquity of the USB standard and the availability of USB ports, either on the computer or on a USB extender connected to the computer, make the use of a USB connection a suitable connector for embodiments of the present invention. The transmitter 120 also includes transceiver 450 and antenna 452, providing for two-way communications with the receiver 110 paired with the transmitter 120. In some embodiments, the transceiver 450 and antenna 452 provide for two-way communications. However, since the dominant operation of the transmitter 120 is transmitting video content to the receiver 110, the nomenclature of "transmitter" is used to describe this component of the communications system.

In some embodiments, when the transmitter 120 is coupled to computer 220 for the first time, the transmitter 120 may identify itself to the computer 220 as a mass storage device, such as a removable disk drive. In one embodiment, for instance, after the transmitter 120 is coupled to the computer 220, the transmitter 120 may identify itself as a removable disk drive to an operating system executing on the computer 220. The operating system can then treat the internal non-volatile memory 420 of the transmitter 120 like any other removable disk. This behavior is similar to the behavior discussed in relation to the camcorder described in U.S. patent application Ser. No. 11/497,039, filed on Jul. 31, 2006, the disclosure of which is hereby incorporated herein by reference in its entirety for all purposes.

In one embodiment, a resident software application is stored in the non-volatile memory 420 of the transmitter 120. When a connection between the transmitter 120 and the computer 220 is detected by the computer 220, an operating system executing on the computer may automatically execute the resident software application. For example, a Windows® operating system may be configured to check the contents of the non-volatile memory of the transmitter for an "autoplay-.inf" file upon detecting a connection between the transmitter and the computer. The "autoplay.inf" file then directs the operating system to the resident software application, which is stored in the non-volatile memory 420 of the transmitter 120. The operating system of the computer 220 then executes the resident software application.

In some embodiments, upon execution, the resident software application may check the computer 220 to determine whether required software components are available on the computer 220, and then install the software components in the computer 220 when the software components are not available on the computer 220. If appropriate software is already installed on the computer 220, then the resident software application may check the installed software to determine if the software is a current version and then update the computer, if needed. For example, the resident software application may determine whether certain compression/decompression algorithms (codecs) are available on the computer 220. If the resident software application determines that the codecs are not available on the computer 220, the resident software application may then automatically install the codecs on the computer 220 without additional user intervention. In other embodiments, the resident software application may wait for verification from a user before installing the software components. The resident software application may also install other software components such as software libraries or application files. The resident software, in one embodiment, may also cause data to be written to memory in the computer 220 for tracking purposes. For instance, the resident software may add entries or keys to the registry of a computer 220 running the Windows® operating system so that upon a subsequent connection to the same computer 220, the resident software application can simply check the registry entries or keys to determine which codecs or software components were previously installed. In still further embodiments, if the version of the resident software application stored in the non-volatile memory 420 is older than the version of the software application installed on the computer, then the resident software application stored in the non-volatile memory 420 may be over-written to update the software stored in the non-volatile memory 420 to the most recent version.

In one embodiment, the resident software application may produce a graphical user interface (GUI) on a display associated with the computer 220. The GUI may present a user with graphical controls to help the user to perform various tasks. Such tasks may include playing digital video footage present on the computer 220, and the like.

As described above, in some embodiments, during an initial connection, the transmitter 120 may identify itself to the computer 220 as a mass storage device and a resident software application present on the transmitter 120 may be used to install software on the computer 220. After completion of these tasks, the transmitter 120 may modify its own operation to function as a transmitter 120 of video footage. This dual-purpose use of transmitter 120 differs from conventional systems in which pluggable devices serve only one of the two roles.

In one embodiment, the processor 430 and switch 460 are operable to convert the use of the transmitter 120 from a mass storage device, as described above, to a wireless transceiver. Logic stored in the non-volatile memory 420 may be utilized in making this switch from the first state of operation (e.g., mass storage device mode) to the second state of operation (e.g., wireless transceiver mode). In an embodiment, after installation of the software on the computer 220, the transmitter 120 may "eject" itself, ceasing to function as a mass storage device, and may begin operation as a wireless transceiver in communication with receiver 110.

It should be noted that, in some embodiments, the transmitter 120 includes not only the functionality of switching from a mass storage device to a wireless transceiver, but also the functionality of switching back to a mass storage device as appropriate. For example, if after use with a first computer, the transmitter is moved to another computer, then the transmitter may repeat the processes described above, acting as a mass storage device, determining if appropriate software is installed, installing and/or updating the software if needed, and/or then switching into the wireless transceiver mode.

Figure 5:
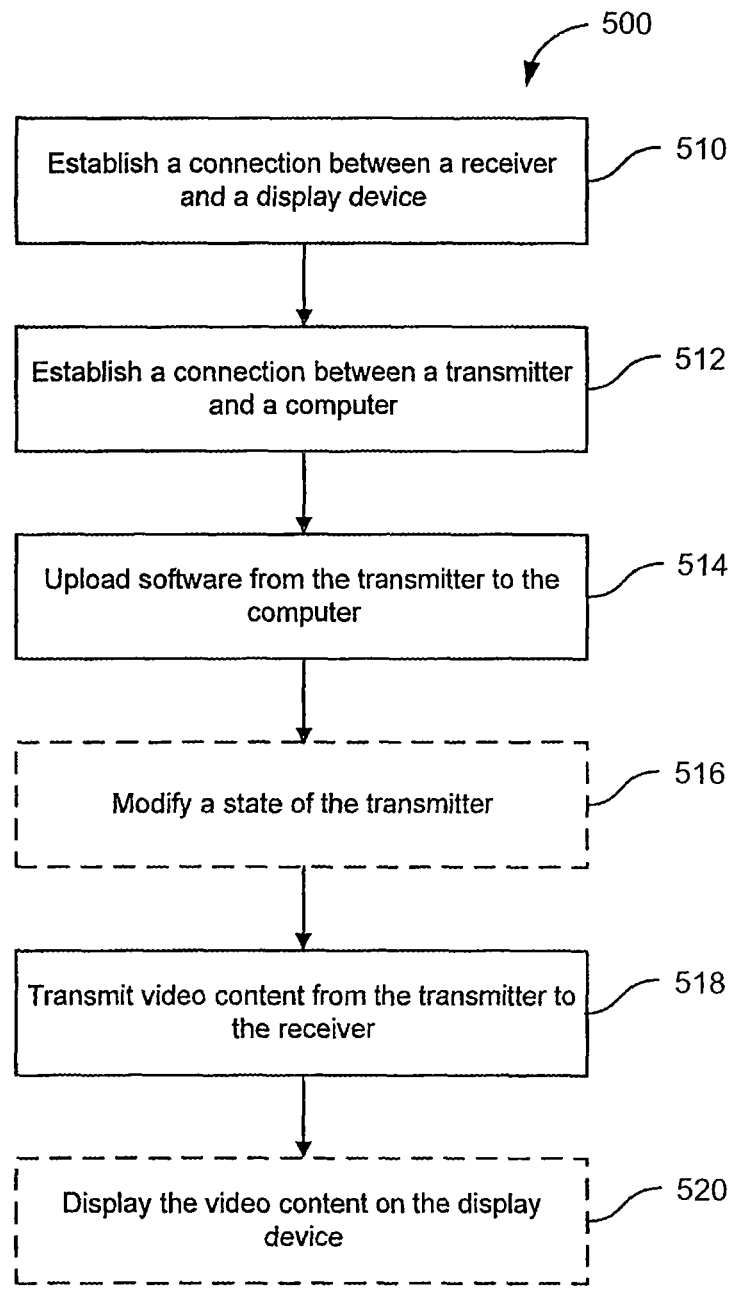
FIG. 5 is a flow diagram of method steps for operating a communications system, according to an embodiment of the present invention.

FIG. 5 is a flow diagram of method steps for operating a communications system, according to an embodiment of the present invention. The method 500 includes establishing a connection between a receiver and a display device (510). The receiver includes a first wireless transceiver, a video output, and an audio output. An exemplary receiver is illustrated as receiver 110 in FIG. 1 in which the video and audio outputs can be combined as an HDMI connector or kept separate in the form of component RCA video/audio outputs. In some embodiments, as described in relation to FIG. 1, the receiver provides for two-way communications. However, since the dominant operation of the receiver is receiving video content from the transmitter 120, the nomenclature of "receiver" is used to describe this component of the communications system. An example of a display device is a television. Establishing the connection between the receiver and the display device may take the form of connecting the two devices using one or more cables, for example, an HDMI cable.

The method 500 also includes establishing a connection between a transmitter and a computer (512). The transmitter includes a second wireless transceiver and a memory. An exemplary transmitter is transmitter 120 with USB connector 122 (i.e., a USB dongle) illustrated in FIG. 1. The transmitter is operable to operate in a first mode and a second mode. In some embodiments, as discussed in relation to FIG. 1, the transmitter provides for two-way communications. However, since the dominant operation of the transmitter is transmitting video content to the receiver 110, the nomenclature of "transmitter" is used to describe this component of the communications system.

The transmitter initially operates in a first mode associated with a mass storage device. Thus, when the transmitter is connected to the computer, for example, by plugging the USB connector of the transmitter into a USB port on the computer, the transmitter appears or is registered as a mass storage device in the operating system. In some embodiments, software stored on the memory of the transmitter can be uploaded and installed on the computer while the transmitter is operating in the first mode (514). This feature of the transmitter enables for distribution of desired software for use in conjunction with embodiments of the invention.

The method 500 also includes an optional process of modifying a state of the transmitter (516) from a first state to a second state. In the second state, the second wireless transceiver is activated and the mass storage device characteristics of the transmitter are turned off. This can be considered as dismounting or ejecting the mass storage device from the computer. Although the transmitter is not physically disconnected from the computer, the transmitter ceases to appear as a mass storage device in the operating system of the computer. This "ejection" operation is similar to ejecting a mass storage device through operating system commands, at which point the mass storage device ceases to be listed as an available disk. In alternative embodiments, the transmitter continues to be displayed as a mass storage device.

The method further includes transmitting the video content from the transmitter to the receiver while operating in the second mode (518). The second mode of operation continues while the transmitter is connected to the computer. The video content can be displayed on the display device (520) as an optional process.

As illustrated in FIG. 1, a remote control 130 is provided in some embodiments of the present invention. In these embodiments, the method 500 can include transmitting one or more control signals from the remote control to the receiver. In turn, the one or more control signals, some subset of the control signals, or additional control signals based on the one or more control signals, can be transmitted from the receiver to the transmitter. Thus, user control over software executing on the receiver or executing on the computer can be provided by use of the remote control. In alternative embodiments, the software application executing on the computer may be configured to allow the user to control the transmitter and/or receiver from the computer. For example, the user may cause a video to be displayed on the display device coupled to the receiver, which is in communication with the transmitter, by selecting the video from the software application executing on the computer.

It should be appreciated that the specific steps illustrated in FIG. 5 provide a particular method of transmitting video content according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, steps may be added or removed depending on the particular applications. One of ordinary skill in the art would recognize many variations, modifications, and alternatives.

Transmitter and Receiver Implementation

Figure 6:
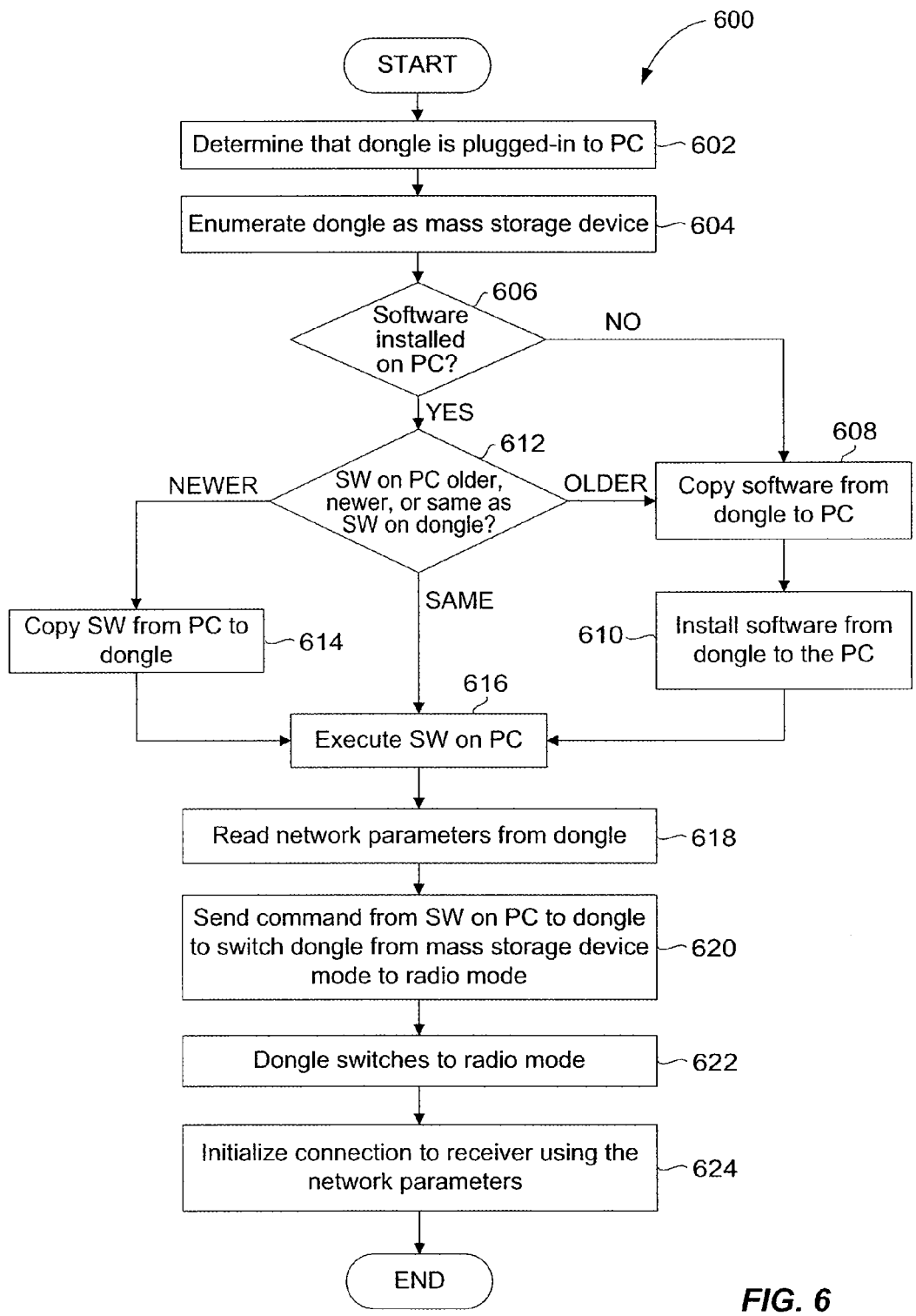
FIG. 6 is a flow diagram of method steps for operating a transmitter in two different modes of operation, according to an embodiment of the present invention.

FIG. 6 is a flow diagram of method steps for operating a transmitter in two different modes of operation, according to an embodiment of the present invention. Persons skilled in the art will understand that, even though the method 600 is described in conjunction with the systems of FIGS. 1-4, any system configured to perform the steps of the method 600 illustrated in FIG. 6, in any order, is within the scope of the invention.

As shown, the method 600 begins at step 602, where an operating system of a computer determines that the transmitter (i.e., the dongle) is plugged-in to the computer. For example, the transmitter may include a USB connector and may be plugged-in to a USB port on the computer. At step 604, the operating system enumerates the transmitter as a mass storage device. In one embodiment, the operating system enumerates the transmitter as a HID (human interface device).

At step 606, the resident software application on the transmitter determines whether the appropriate software components are installed on the computer. If, at step 606, the resident software application determines that the appropriate software components are not installed on the computer, then, at step 608, the resident software application causes the appropriate software components to be copied to the computer. At step 610, the software components are installed on the computer. If, at step 606, the resident software application determines that the software components are already installed on the computer, then the method 600 proceeds to step 612.

At step 612, the resident software application determines whether the software components already installed on the computer are older, newer, or the same as the software components stored in the non-volatile memory of the transmitter. In one embodiment, the software components are associated with a version number, and determining whether the software components already installed on the computer are older, newer, or the same as the software components stored in the non-volatile memory of the transmitter includes comparing the version numbers of the software components.

If, at step 612, the resident software application determines that the software components already installed on the computer are older than the software components stored in the non-volatile memory of the transmitter, then the method 600 proceeds to step 608, described above. If, at step 612, the resident software application determines that the software components already installed on the computer are newer than the software components stored in the non-volatile memory of the transmitter, then the method 600 proceeds to step 614. At step 614, the resident software application causes the software components from the computer to be copied to the non-volatile memory of the transmitter. In this manner, the version of the software components stored in the non-volatile memory of the transmitter is updated to reflect a newer version of the software components. Thus, if the transmitter were to be plugged-in to a different computer that does not include any of the software components, then the updated software components stored in the non-volatile memory of the transmitter would be copied to the different computer.

If, at step 612, the resident software application determines that the software components already installed on the computer are the same (e.g., the same version) as the software components stored in the non-volatile memory of the transmitter, then the method 600 proceeds to step 616. As step 616, a processor included in the computer executes the software components.

At step 618, the software components executing on the computer read network parameters from the non-volatile memory of the transmitter. In one embodiment, the transmitter and receiver are pre-configured to be paired with one another, as described herein. An SSID (Service Set Identifier) and/or a network password may be stored in the non-volatile memory of the transmitter. Reading the network parameters may include reading the SSID and/or network password from the non-volatile memory. In some embodiments, the SSID and/or network password may be encrypted, and the software components executing on the computer are configured to decrypt the encrypted SSID and/or encrypted network password.

At step 620, the software components executing on the computer send a command to the transmitter to switch the transmitter from mass storage device mode to radio mode. At step 622, the transmitter switches to radio mode in response to receiving the command from the software components executing on the computer. In one embodiment, the switch 460, shown in FIG. 4, is operable to convert the transmitter from mass storage device mode to radio mode. In one embodiment, the switch 460 is a software switch, and logic stored in the non-volatile memory is utilized in making the switch from the first state of operation (e.g., mass storage device mode) to the second state of operation (e.g., wireless transceiver/radio mode). In an alternative embodiment, the switch 460 is a physical hardware switch. For example, the switch 460 may comprises one or more transistors. In further embodiments, the switch 460 comprises a latch or a slider located on the outside of the transmitter that can be toggled by a user to manually switch the transmitter from a first mode to a second mode.

At step 624, the transmitter initializes a connection to the receiver using the network parameters. In one embodiment, the software components executing on the computer are operable to configure the network connection between the transmitter and the receiver based on the SSID and the network password read from the non-volatile memory at step 618. Once the network connection is established, the transmitter and receiver are operable to allow content to be transmitter from the transmitter to the receiver for playback on a display device coupled to the receiver.

According to another embodiment of the invention, the receiver comprises an embedded system that includes a memory and a processor. The memory stores an operating system that is executed by the processor. As described above, the receiver may be in wireless communication with the transmitter. This communication may be supported by software (e.g., firmware) executing on the receiver.

In some embodiments, the transmitter may be capable of switching back to mass storage device mode from wireless communications mode. In these embodiments, the software stored on the mass storage device can be updated when the software executing on the computer detects that an update is available. For example, the software executing on the computer may detect that an update is available while the transmitter is operating in wireless communications mode. The software executing on the computer may be configured to transmit a signal to the transmitter to switch the transmitter back to mass storage mode. Then, the software stored on the transmitter can be updated. Advantageously, with these embodiments, the software can be updated without the user having to unplug the transmitter from the computer and then re-connect the transmitter to the computer.

Updating Receiver Firmware

Figure 7:
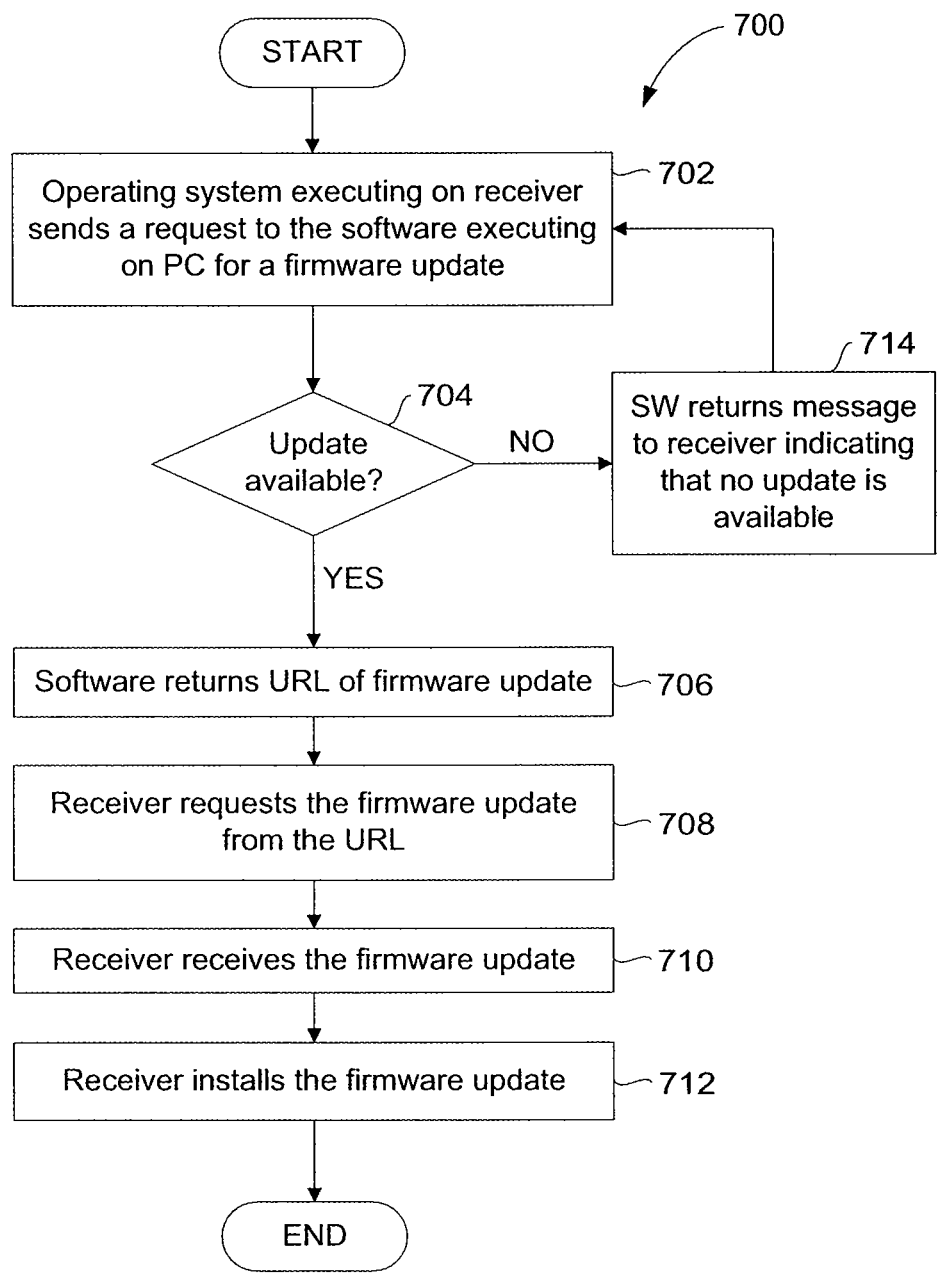
FIG. 7 is a flow diagram of method steps for updating firmware on the receiver, according to an embodiment of the present invention.

FIG. 7 is a flow diagram of method steps for updating firmware on the receiver, according to an embodiment of the present invention. Persons skilled in the art will understand that, even though the method 700 is described in conjunction with the systems of FIGS. 1-4, any system configured to perform the steps of the method 700 illustrated in FIG. 7, in any order, is within the scope of the invention.

As shown, the method 700 begins at step 702, where an operating system executing on the receiver sends a request to the software executing on the computer for a firmware update. In one embodiment, the request for the firmware update is transmitted from the transceiver included in the receiver to the transceiver included in the transmitter. The transceiver included in the transmitter then transmits, or "relays," the request to the software executing on the computer.

At step 704, the software executing on the computer determines whether a firmware update is available. In one embodiment, the request includes metadata that corresponds to the current version of the firmware installed on the receiver. Determining whether a firmware update is available may include comparing the metadata included in the request against data stored on the computer or in a remote location. For example, the software executing on the computer may access a location stored on a remote server (e.g., on a webpage or web server) to determine the most recent version of the firmware and compare the most recent version to the version included in the request. If, at step 704, the software executing on the computer determines that a firmware update is available, then the method 700 proceeds to step 706.

At step 706, the software executing on the computer returns a URL (uniform resource locator) associated with the firmware update to the receiver. At step 708, the receiver requests the firmware update by accessing the URL. In an alternative embodiment, the software executing on the computer returns the firmware update to the receiver, instead of returning the URL, and step 708 is omitted. At step 710, the receiver receives the firmware update. At step 712, the receiver installs the firmware update.

Referring again to step 704, if the software executing on the computer determines that no firmware update is available, then the method 700 proceeds to step 714. At step 714, the software executing on the computer returns a message to the receiver indicating that no firmware update is available. The method 700 then returns to step 702. In one embodiment, the receiver is configured to periodically transmit a firmware update request that inquires about a potential firmware update. For example, the receiver may transmit a firmware update request once a month.

Dual-Function Device Implementation

Further embodiments of the invention provide for a dual-function device. In these embodiments, the receiver 110 is not necessarily included in the system since there is no longer a transmitting device.

In such embodiments, a device is provided that includes a non-volatile memory and a data connector. Once the device is coupled to a computer system via the data connector, the device may be enumerated as a mass storage device, as a CD-ROM device, or as any other storage device accessible by the computer system. A software package and/or drivers for operating the device may be included in the non-volatile memory (e.g., NAND memory) included within the device. The software package and/or drivers are then installed on the computer system. Once the software package and/or drivers are installed, a signal is transmitted from the computer system to the device to switch the device from a storage device to "another" device having some other useful functionality. For example, the device may switch from a storage device to a printer device, a scanner device, or any other technically feasible device having some other useful functionality. Thus, in the second operating mode, the device may provide the actual intended functionality of the device, whereas, in the first operating mode, the device itself, configured as a mass storage device, provides a delivery mechanism for installing the necessary software or drivers necessary for operating the device in the second operating mode.

Figure 8:
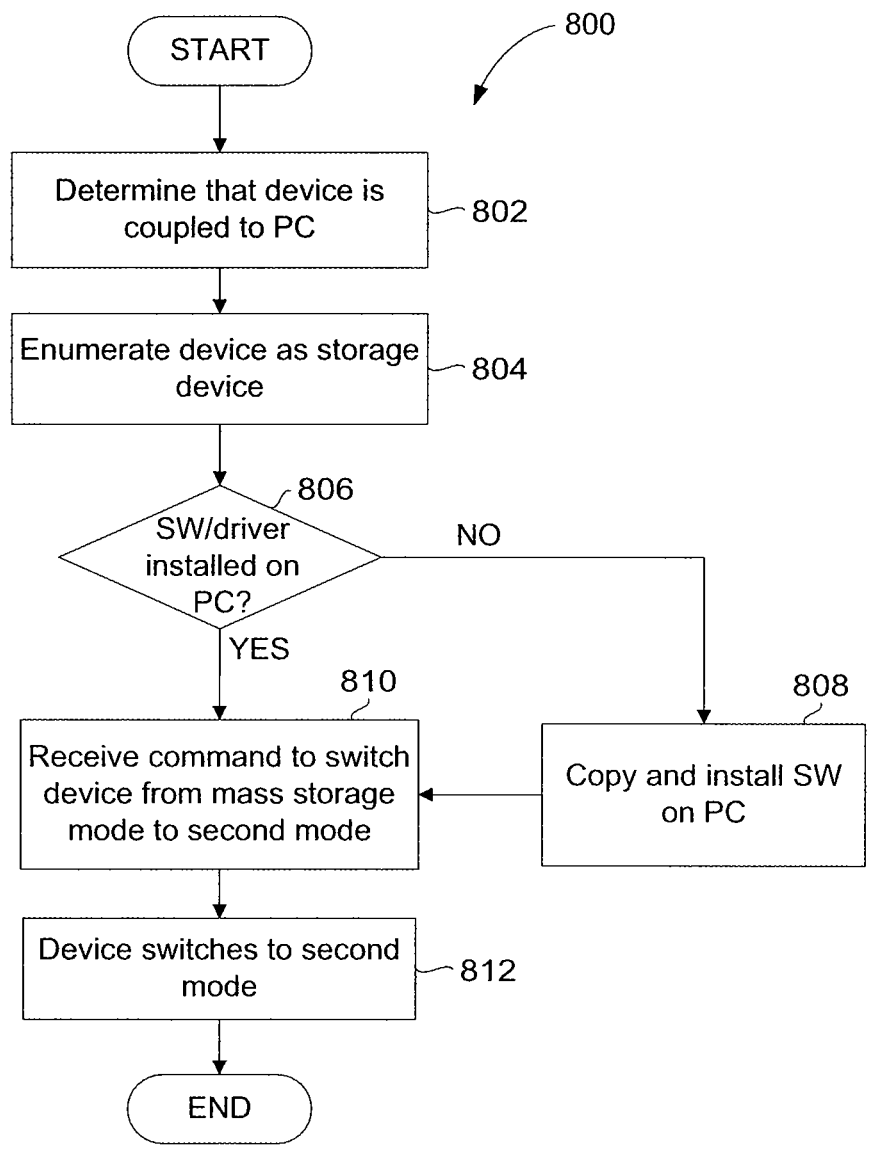
FIG. 8 is a flow diagram of method steps for operating a dual function device, according to an embodiment of the present invention.

FIG. 8 is a flow diagram of method steps for operating a dual function device, according to an embodiment of the present invention. Persons skilled in the art will understand that, even though the method 800 is described in conjunction with the systems of FIGS. 1-4, any system configured to perform the steps of the method 800 illustrated in FIG. 8, in any order, is within the scope of the invention.

As shown, the method 800 begins at step 802, where an operating system of a computer determines that a device is coupled to the computer. For example, the device may include a USB connector that may be plugged-in to a USB port on the computer. At step 804, the operating system enumerates the device as a storage device. In one embodiment, the operating system enumerates the device as a USB mass storage device. In alternative embodiments, operating system enumerates the device as a CD-ROM drive.

At step 806, a resident software application stored in non-volatile memory included in the device determines whether the appropriate software components and/or drivers are installed on the computer. If, at step 606, the resident software application determines that the appropriate software components and/or drivers are not installed on the computer, then the method 800 proceeds to step 808. At step 808, the resident software application causes the appropriate software components and/or drivers to be copied to the computer and installed on the computer. If, at step 806, the resident software application determines that the software components are already installed on the computer, then the method 600 proceeds to step 810.

At step 810, the device receives a command from the software components and/or drivers that are now executing on the computer to switch the device from storage device mode to a second mode of operation. In some embodiments, a software application, a driver, a service, or a daemon executing on the computer system may detect that the device in mass storage mode is coupled to the computer system and may cause the command to be transmitted to the device. Additionally, in some embodiments, the command is a HID (Human Interface Device) command to switch the device to the second mode of operation. In alternative embodiments, where the device is enumerated as a CD-ROM device, the command may be an eject command to eject the CD-ROM drive. In still further embodiments, the command may be a dismount or disconnect command. In yet further embodiments, the command may be a SCSI (Small Computer System Interface)

mass storage class command. As described herein, the second mode of operation may include the device acting as a printer device, a scanner device, or any other device that may require initial configuration information to function properly.

At step 812, the device switches to the second mode of operation in response to receiving the command from the software components executing on the computer. In one embodiment, the switch 460, shown in FIG. 4, is operable to convert the transmitter from mass storage device mode to radio mode. In one embodiment, the switch 460 is a software switch, and logic stored in the non-volatile memory is utilized in making the switch from the first state of operation (e.g., mass storage device mode) to the second state of operation (e.g., printer or scanner mode). In an alternative embodiment, the switch 460 is a physical hardware switch.

In some embodiments, when the device is operating in the second mode of operation, the device may be operable to communicate with one or more other devices (e.g., a transmitter device that communicates with one or more receiver devices).

One advantage of these embodiments is that manufacturing costs are reduced since a CD (compact disc) or DVD (digital versatile disc) that includes the drivers and/or software does not need to be shipped or sold with the device. Moreover, the user will always have access to the installation or configuration files for the device since the installation or configuration files are included in the device. Thus, the user can never "lose the CD" that includes the appropriate installation files. Another advantage is ease of installation, since no user input is required to install and configure the device. Yet another is a better user experience, since the "real" device (e.g., operating the device in the second mode of operation) is hidden from the user and the computer until all the necessary software and/or drivers for proper operation are installed on the computer. Still another advantage is that since the non-volatile memory is not accessible to the user in the second mode of operation, the user is prevented from performing destructive actions (either accidentally or intentionally) to configuration information or settings stored in the non-volatile memory.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A transmitter device, comprising:
 a non-volatile memory storing network parameters for establishing a wireless network connection between the transmitter device and a receiver device, wherein the wireless network connection is established responsive to receiving a wireless Dynamic Host Configuration Protocol (DHCP) request from the receiver device, wherein the network parameters comprise at least one of a service set identifier (SSID) and a password;
 a Universal Serial Bus (USB) connector adapted to couple the transmitter device to a computer system, wherein data is transmitted between the transmitter device and the computer system via the connector when the transmitter device is coupled to the computer system and operating in a mass storage mode;
 a transceiver configured to perform two-way wireless communications with the receiver device when the transmitter device is operating in a wireless communications mode, wherein the receiver device is configured to output, to a display device coupled to the receiver device, a media item wirelessly received from the transmitter device, wherein the receiver device is configured to perform wireless communications only with the transmitter device to the exclusion of any other network devices based on uniquely pre-pairing of the transmitter device and the receiver device based on a unique identifier of the receiver device; and
 a physical switch comprising a switching logic configured to switch from the mass storage mode to the wireless communications mode, wherein the transmitter device is configured to operate in one of the wireless communications mode and the mass storage mode while coupled to the computer system.

2. The transmitter device of claim 1, wherein the receiver device comprises a set-top box, a printer, or a scanner.

3. The transmitter device of claim 1, wherein an end-user need not pair the transmitter device and the receiver device as a condition to establishing the network connection.

4. The transmitter device of claim 1, wherein the transmitter device is enumerated by an operating system executing on the computer system as a mass storage device upon being coupled to the computer system.

5. The transmitter device of claim 1, wherein the switching logic is further configured to receive a signal from a software application executing on the computer system.

6. The transmitter device of claim 1, wherein the switching logic is configured to switch the transmitter device from the mass storage mode to the wireless communications mode based at least in part on a signal received from the computer system via the connector.

7. A method, comprising:
 determining that a transmitter device coupled to a computer system is operating in a mass storage mode;
 reading network parameters stored in a non-volatile memory included in the transmitter device;
 transmitting a command to the transmitter device to cause the transmitter device to cease operating in the mass storage mode and to operate in the wireless communications mode, wherein the transmitter device is configured to operate in one of the wireless communications mode and the mass storage mode while coupled to the computer system; and
 responsive to receiving a wireless Dynamic Host Configuration Protocol (DHCP) request broadcast by a receiver device, causing the transmitter device to establish a wireless network connection with the receiver device based at least in part on the network parameters, wherein the receiver device is configured output, to a display device coupled to the receiver device, a media item wirelessly received from the transmitter device, wherein the receiver device is configured to perform wireless communications only with the transmitter device to the exclusion of any other network devices based on uniquely pre-pairing of the transmitter device and the receiver device based on a unique identifier of the receiver device such that an end-user need not pair the transmitter device and the receiver device as a condition to establishing the network connection.

8. The method of claim 7, further comprising the steps of:
determining that a software application stored in the non-volatile memory is not installed on the computer system; and
causing the software application to be installed on the computer system.

9. The method of claim 7, wherein the receiver device comprises at least one of a set-top box and a computer peripheral, wherein the network parameters include at least one of an SSID (Service Set Identifier) and a network password, the method further comprising:
upon determining that a first version of a software application stored in the non-volatile memory is less recent than a second version of the software application installed on the computer system, causing the second version of the software application to be stored in the non-volatile memory included in the transmitter device.

10. The method of claim 7, wherein the network parameters include at least one of an SSID (Service Set Identifier) and a network password, the method further comprising:
responsive to receiving a request from the transmitter device to update firmware associated with the receiver device, causing a signal to be transmitted to the receiver device that causes the firmware to be updated to a more recent version.

11. The method of claim 7, wherein the connector is a USB (Universal Serial Bus) connector.

12. The method of claim 7, wherein the transmitter device further comprises a switching logic configured to switch from the mass storage mode to the wireless communications mode.

13. A computer-readable storage medium storing instructions that, when executed by a processor, cause a transmitter device to operate in two modes, by performing the steps of:
reading network parameters stored in a non-volatile memory included in the transmitter device responsive to determining that the transmitter is coupled to a computer system when the transmitter is operating in a mass storage mode;
transmitting a command to the transmitter device to cause the transmitter device to cease operating in the mass storage mode and to operate in the wireless communication mode, wherein the transmitter device is configured to operate in one of the wireless communication mode and the mass storage mode while coupled to the computer system; and
causing the transmitter device to establish, responsive to receiving a wireless Dynamic Host Configuration Protocol (DHCP) request from a receiver device, a wireless network connection with the receiver device based at least in part on the network parameters, wherein the receiver device is configured output, to a display device coupled to the receiver device, a media item wirelessly received from the transmitter device, wherein the receiver device is configured to perform wireless communications only with the transmitter device to the exclusion of any other network devices based on uniquely pre-pairing of the transmitter device and the receiver device based on a unique identifier of the receiver device such that an end-user need not pair the transmitter device and the receiver device as a condition to establishing the network connection.

14. The computer-readable storage medium of claim 13, further comprising the steps of:
determining that a software application stored in the non-volatile memory is not installed on the computer system; and
causing the software application to be installed on the computer system.

15. The computer-readable storage medium of claim 13, wherein the network parameters include at least one of an SSID (Service Set Identifier) and a network password, the computer-readable storage medium further comprising the steps of:
upon determining that a first version of a software application stored in the non-volatile memory is less recent than a second version of the software application installed on the computer system, causing the second version of the software application to be stored in the non-volatile memory included in the transmitter device; and
responsive to receiving a request from the transmitter device to update firmware associated with the receiver device, causing a signal to be transmitted to the receiver device that causes the firmware to be updated to a more recent version.

16. A computer-readable storage medium storing instructions that, when executed by a processor, perform the steps of:
determining that a transmitter device coupled to a computer system is operating in a mass storage mode;
reading network parameters stored in a non-volatile memory included in the transmitter device;
transmitting a command to the transmitter device to cause the transmitter device to cease operating in the mass storage mode and to operate in the wireless communications mode, wherein the transmitter device is configured to operate in one of the wireless communications mode and the mass storage mode while coupled to the computer system; and
responsive to receiving a wireless Dynamic Host Configuration Protocol (DHCP) request broadcast by a receiver device, causing the transmitter device to establish a wireless network connection with the receiver device based at least in part on the network parameters, wherein the receiver device is configured output, to a display device coupled to the receiver device, a media item wirelessly received from the transmitter device.

17. The computer-readable storage medium of claim 16, further comprising:
determining that a software application stored in the non-volatile memory is not installed on the computer system; and
causing the software application to be installed on the computer system.

18. The computer-readable storage medium of claim 17, further comprising:
responsive to receiving a request from the transmitter device to update firmware associated with the receiver device, causing a signal to be transmitted to the receiver device that causes the firmware to be updated to a more recent version.

19. The computer-readable storage medium of claim 16, wherein the receiver device comprises at least one of a set-top box and a computer peripheral, wherein the network parameters include at least one of a Service Set Identifier (SSID) and a network password.

* * * * *